(12) United States Patent
Chuyko et al.

(10) Patent No.: US 10,782,124 B2
(45) Date of Patent: Sep. 22, 2020

(54) METHOD AND DEVICE FOR MEASURING THE SHAPE, DIMENSIONS AND FLEXIBILITY OF SHOES

(71) Applicant: LIMITED LIABILITY COMPANY "FITTIN", Voronezh (RU)

(72) Inventors: Grigory Vladimirovich Chuyko, Voronezh (RU); Ivan Sergeevich Shedrin, Voronezh (RU); Egor Andreevich Revkov, Novosibirsk (RU); Natalja Demjanovna Grishko, Novosibirsk (RU); Viktor Valerevich Posmetev, Voronezh (RU); Dmitry Mihajlovich Kanin, selo Jamnoe (RU); Leonid Dmitrievich Buhtojarov, Voronezh (RU)

(73) Assignee: LIMITED LIABILITY COMPANY "FITTIN", Voronezh (RU)

( * ) Notice: Subject to any disclaimer, the term of this patent is extended or adjusted under 35 U.S.C. 154(b) by 0 days.

(21) Appl. No.: 16/483,847

(22) PCT Filed: May 25, 2017

(86) PCT No.: PCT/RU2017/000351
§ 371 (c)(1),
(2) Date: Aug. 6, 2019

(87) PCT Pub. No.: WO2018/151620
PCT Pub. Date: Aug. 23, 2018

(65) Prior Publication Data
US 2020/0011658 A1 Jan. 9, 2020

(30) Foreign Application Priority Data
Feb. 17, 2017 (RU) .................................. 2017105135

(51) Int. Cl.
| | | |
|---|---|---|
| G01B 11/24 | (2006.01) | |
| A43D 1/08 | (2006.01) | |
| G01B 5/20 | (2006.01) | |
| G01B 5/30 | (2006.01) | |
| G01B 11/16 | (2006.01) | |

(52) U.S. Cl.
CPC ............... G01B 11/24 (2013.01); A43D 1/08 (2013.01); G01B 5/20 (2013.01); G01B 5/30 (2013.01); G01B 11/16 (2013.01)

(58) Field of Classification Search
CPC . A43D 1/08; A43D 1/06; A43D 1/025; G01B 11/24; G01B 11/16; G01B 11/245;
(Continued)

(56) References Cited

U.S. PATENT DOCUMENTS

| | | |
|---|---|---|
| 5,457,325 A | 10/1995 | Huberty et al. |
| 7,343,691 B2 * | 3/2008 | Long ............ G01B 3/1084 33/555.4 |

(Continued)

FOREIGN PATENT DOCUMENTS

| | | |
|---|---|---|
| KR | 20040078939 A | 9/2004 |
| RU | 94006846 A1 | 12/1995 |

(Continued)

*Primary Examiner* — Hoa Q Pham
(74) *Attorney, Agent, or Firm* — Nadya Reingand; Yan Hankin

(57) ABSTRACT

The invention relates to measurement technology and is intended for measuring the shape, the internal dimensions and the flexibility of shoes. The proposed measurement method consists in using probes with indicators, which create tension on the measured surface. A camera and a flat marking band are used for tracing the shape of the internal surface of a shoe. On the basis of the sum of the images, a three-dimensional model of the internal surface of the tested shoe is made, and the flexibility properties are determined by scanning the object with different forces. A device comprises a body, a camera mounted therein, two or more probes with indicators, and a flat marking band. The invention makes it (Continued)

possible to increase accuracy and to reduce the labor intensiveness and time of measurements.

2 Claims, 11 Drawing Sheets

(58) Field of Classification Search
CPC ...... G01B 11/285; G01B 5/20; G01B 5/0004; G01B 5/30; G01B 5/26; G01N 21/954; A61B 5/1074; A61B 5/1077
USPC ...... 356/237.6, 601–640, 241.1–241.6; 33/6, 33/2 R, 3 R, 3 B, 3 C, 17 R, 542; 382/154; 600/587
See application file for complete search history.

(56) References Cited

U.S. PATENT DOCUMENTS

| | | | |
|---|---|---|---|
| 7,446,884 B2 | 11/2008 | Massen | |
| 7,625,335 B2* | 12/2009 | Deichmann | A61B 1/05 600/117 |
| 7,779,705 B2* | 8/2010 | Mastinu | G01L 3/22 73/862.381 |
| 8,945,238 B2* | 2/2015 | Mosler | A61F 2/68 623/55 |
| 8,988,503 B2* | 3/2015 | Pfeiffer | A43D 1/06 348/46 |
| 10,274,302 B2* | 4/2019 | McGuire | G01B 5/012 |
| 10,470,526 B1* | 11/2019 | Vladimirov | A43D 1/06 |
| 2005/0168756 A1* | 8/2005 | Massen | G01B 11/24 356/601 |
| 2010/0154566 A1* | 6/2010 | Ehrenleitner | B66C 13/06 73/862.641 |
| 2012/0316827 A1* | 12/2012 | Wilkinson | G01B 21/20 702/150 |
| 2018/0153388 A1* | 6/2018 | Soliman | A61B 1/012 |

FOREIGN PATENT DOCUMENTS

| | | |
|---|---|---|
| SU | 35002 A1 | 2/1934 |
| SU | 1329760 A1 | 8/1987 |

\* cited by examiner

METHOD AND DEVICE FOR MEASURING THE SHAPE, DIMENSIONS AND FLEXIBILITY OF SHOES

CROSS-REFERENCE TO RELATED APPLICATIONS

The present patent application is a National stage application of the PCT application PCT/RU2017/000351 filed May 25, 2017, which claims priority to Russian patent application RU2017105135 filed Feb. 17, 2017.

FIELD OF INVENTION

The invention relates to a measurement technique and methods of measurement, it can be used in the shoe industry, in particular in devices for determining the dimensions of shoes of most different types, from boots to sandals.

BACKGROUND

The methods and device can be used in the shoe, garment and knitwear industry when measuring, manufacturing, designing, evaluating the quality of shoes (including anatomical/orthopedic), clothing and headwear, as well as products that must exactly fit the human body, such as orthopedic insoles, orthoses, prostheses. They can be used in everyday life, in the trade industry when putting on the market, selling and remotely purchasing shoes, clothing items, headwear that fit the actual special body characteristics of the customer.

The methods and device can also be used when measuring other thin-walled objects: pipes, siphons, various vessels, channels of any shape, and others. The device can measure the following parameters: girths, circumference, ovality, deviation of shape, geometry of a profile.

Known is a device for determining the inner surface of a shoe, the operating principle of which is based on the fact that on a probe, which is rigidly connected to a camera, a sensing element is arranged that gets into contact with the surface to be measured, and the camera is guided by a 2D image of marks located outside the object, the image being variable relative to the camera. And a 3D model is being built programmatically, see US20100238271 A1, Sep. 23, 2010.

The drawbacks of the known device are the presence of only one sensing probe; the need to manually go over the entire surface; the distortion of measurement results due to the different magnitude of pressure of the probe; the labour intensity and the duration of the measurements.

Known is a method for detecting the three-dimensional shape of interior spaces, such as shoes, pipes by an optical method, and a device for carrying out said method, see US 2005/0168756 A1, Aug. 4, 2005.

Said invention relates to a method of optically detecting the three-dimensional shape of interior spaces and devices for carrying out the method. The operating principle of the prototype is that a formfitting material with a marking is fastened to the inner wall of the space. The camera is housed inside and takes a series of overlapping images. The images are processed by a photogrammetric method and a 3D model of the inner surface is received.

The drawback of this approach is the need to fasten the marking material over the entire surface to be measured, what is difficult since it is necessary to provide for adhesive means and their subsequent removal. In addition, the true shape of the object to be measured may be distorted if the material is not solid.

The technical result of the method of measuring the shape, dimensions and elastic properties of the inner surface of hollow objects is to improve accuracy, to reduce labour intensity and measurement time.

SUMMARY

The technical result is achieved by using a method of measuring the shape, dimensions and elastic properties of the inner surface of hollow objects in which, when the device is inserted into the object to be measured, a camera, through indicators located on probes that create a uniform state of stress on the surface to be measured, receives spatial data in relation to a flat marking strip, by means of which a three-dimensional model of the interior space of the object is built, the dimensions of which are received as a result of measuring the recovered three-dimensional model, and the elastic properties are obtained as a result of scanning the same object with different force and measuring the difference modulus between the final and the original dimensions of the deformed body.

The method suggests a combination of a contact and a contactless method of measuring 3D objects. The device allows to receive a three-dimensional digital model of the object by way of collecting data on its shape and dimensions. A camera image is used to extract 3D data (collecting information about the dimensions and shape of the surface within its field of view). As a result, a geometric cloud of points of the surface of the object is received.

Improvement of the accuracy is achieved, among others, in that at the same time the section of the elastic tubular object restores itself under the impact of mechanical expansion stress exerted by the probes of the device.

In order to give the elastic object a true shape, the surface is uniformly expanded within the limits of the section to be measured by a system of elastic probes.

For a smooth initial insertion of the device into the object to be measured, a mechanism of retracting and extending the probes is used.

The probes being in a state of stress tightly adjoin to the surface to be measured, so that in the case of elasticity of the material to be measured it will recover the original shape, thereby increasing the accuracy of measurements.

Contrary to the prototype, we suggest using a marking material only on one side. The generation of a 3D model of the inner surface is in our case not to be attributed to the images of the object to be measured, but to the images of the positions of the indicators on the probes in relation to the flat marking strip. In addition, the probes are inside the space to be measured in a state of stress and evenly stretch the material of the object, what allows to measure its original, non-deformed shape.

The measurement results are issued in the form of a cloud of points, which creates a CAD file (obj).

The mechanism of the device is equipped with measuring probes.

The reading of the three-dimensional axes coordinates takes place while they are moving along the inner surface of the object. The device is equipped with a video or photo camera, which allows to receive information about the exact position of the tip of the scanning probe in real time in three planes.

DETAILED DESCRIPTION OF THE PREFERRED EMBODIMENT

Figure 1:
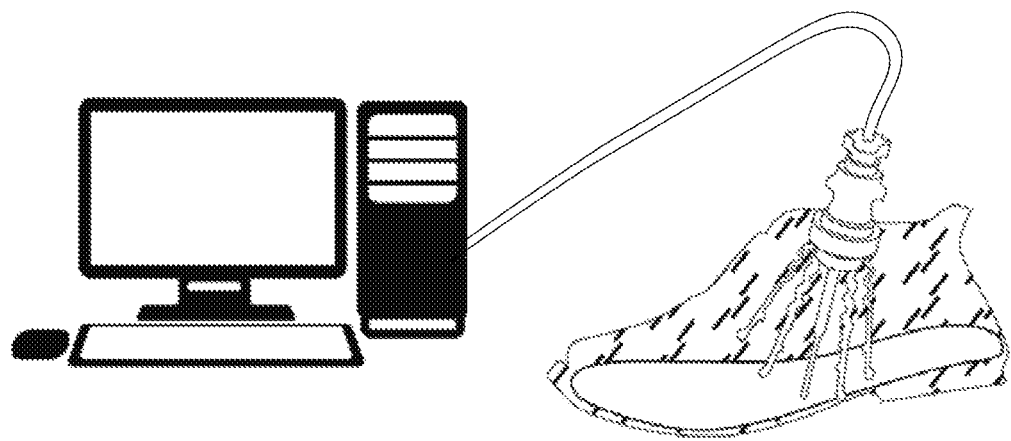
FIG. 1 shows the device in a position determining the shape and dimensions of a shoe.

FIG. 1 shows the device in a position determining the shape and dimensions of a shoe.

The technical result of the method of building a three-dimensional model of the inner surface of hollow objects is to increase accuracy, to reduce labour intensity and measurement time.

This is achieved by using a method in which, when the device is inserted into the object to be measured, a camera, through indicators located on probes that create a uniform state of stress on the surface to be measured, receives spatial data in relation to a flat marking strip, by means of which a three-dimensional model of the interior space of the object is built, the dimensions of which are received as a result of measuring the recovered three-dimensional model, and the elastic properties are obtained as a result of scanning the same object with different force and measuring the difference modulus between the final and the original dimensions of the deformed body.

Figure 2:
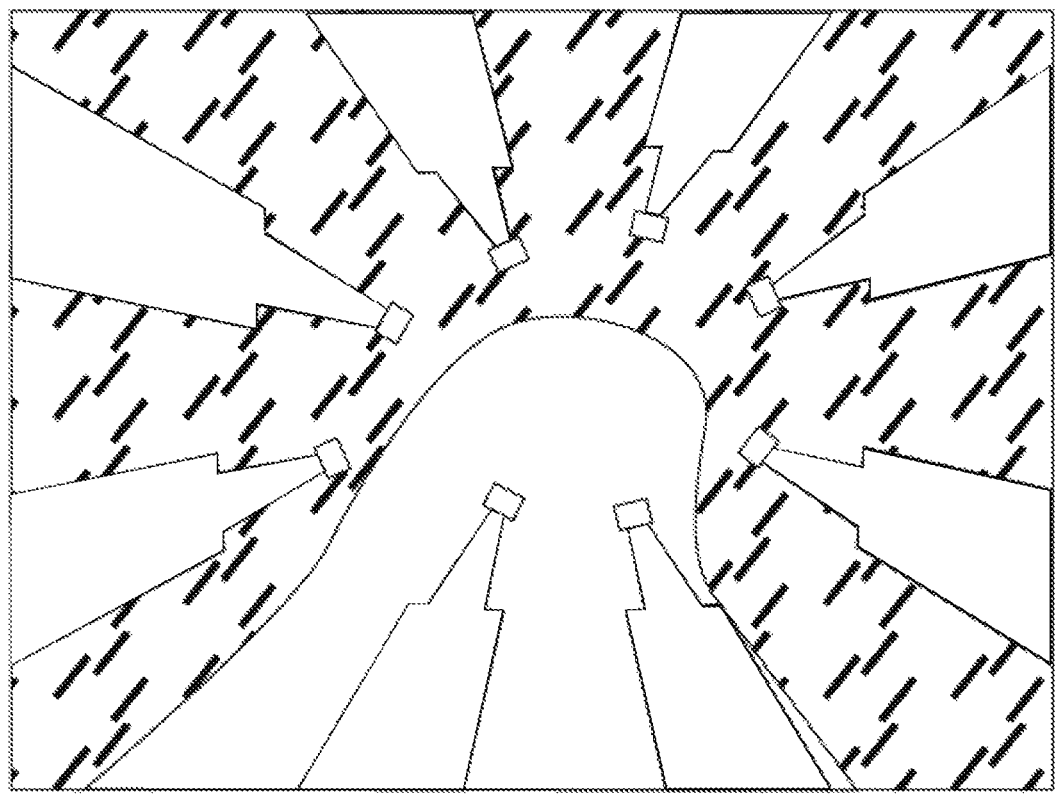
FIG. 2 shows a camera image, on which the flat marking strip and the indicators can be clearly seen.

When inserting the device into the object to be measured, images are recorded from the camera. In the process of further processing for each image the position of the indicators of the probes and of the fragments of the image of the flat marking strip is determined. FIG. 2 shows a camera image, on which the flat marking strip and the indicators can be clearly seen, what, based on the received information, allows to process the images by means of software and to obtain the coordinates of the points of the object to be measured.

On the image of the indicators of the probes a search for the green colour channel G of the image format RGB (red, green, blue) is performed. The search is performed in two stages. First, by a full scan, the green colour pixels are memorized. Then, among them, by means of the Monte-Carlo method it is searched for areas of circular shape (5 pixels in radius with an image size of 640×480 pixels) comprising the maximum number of green pixels. After finding the first indicator, the green pixels belonging to it are removed from the main image and a search of the next indicator is performed. After it is impossible to find another circular area filled with green pixels, a conclusion as to the number of indicators in the field of view is drawn.

Video recording is stopped when the number of indicators in the field of view decreases significantly (in particular, from 8 to 3), which means straightening of the probes when the device exits the cavity to be measured.

On each image, the indicators of the probes allow to achieve information about the section of the inner surface.

The sequence of images allows to receive a plurality of sections of the inner surface—a cloud of points. For combining sections with each other, a flat marking strip is used, allowing to establish the location of each measured section in space with high accuracy.

Since the indicators are distant from the ends of the probes, a preliminary calibration is performed, allowing to correlate the distance of the indicator in pixels from the optical centre of the image with the actual angle between the axis of the camera and the point of contact of the probe on the inner surface.

The image on the marker strip is a random combination of rectangles and ellipses in black and white. The distribution of the figures by dimensions is selected in such way that small fragments of the image were unique and did not repeat themselves on the same marker strip. The requirement of uniqueness must be fulfilled in a wide range of characteristic distances: for fragments of different dimensions (in particular, square fragments from 2×2 mm$^2$ to 20×20 mm$^2$).

Since the probes have a certain width, they cover a large part of the image of the flat marking strip. Therefore, in order to determine the position of the device, fragments of the image of the marking strip are used which are enclosed between probes (in particular, when measuring the front part of a shoe) or between the ends of the probes (in particular, when measuring the back part of a shoe).

To search for fragments of the image of the marker strip, the Monte-Carlo method with narrowing ranges is used, allowing to determine the $x_\varphi$, $y_\varphi$ coordinates of a fragment in the coordinate system of the marker strip, the dimension of a fragment of square shape $a_\varphi$, and to link these parameters with the parameters of the fragment in the image coming from the camera: the x, y coordinates, and the trapezoid parameters, representing a distorted square fragment when viewed at an angle (the difference between the upper and lower edge, the horizontal offset of the upper edge relative to the lower one, the trapezoid rotation angle as a whole). As a criterion for combining the fragments of the images, the sum of squares of the intensity differences of the corresponding pixels is used.

Figure 3:
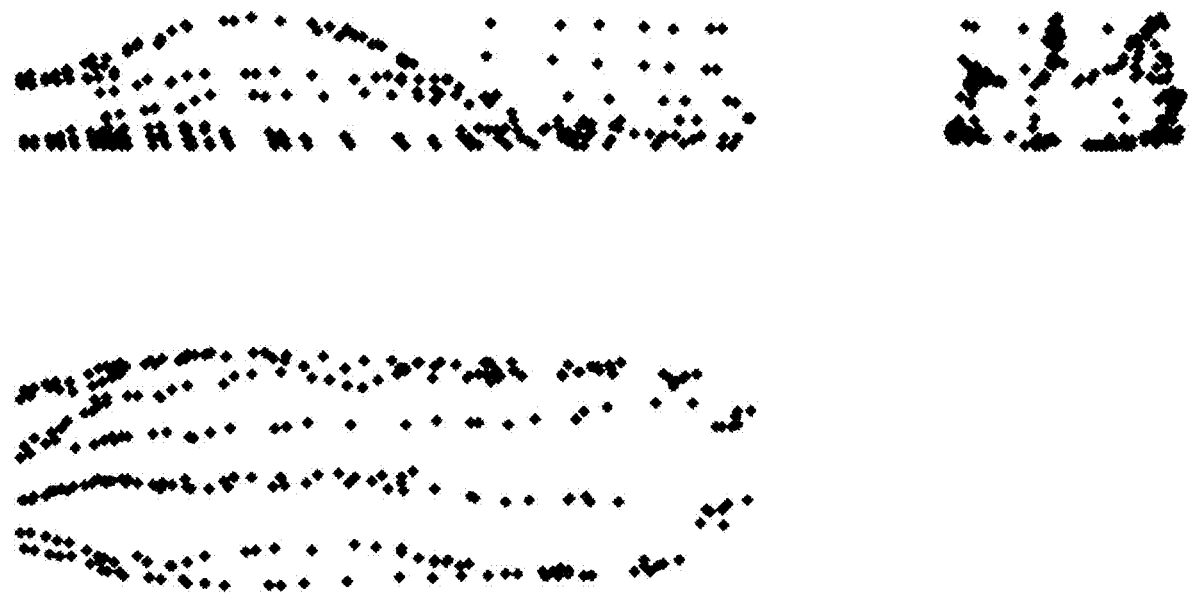
FIG. 3 shows the clouds of points.

For each frame, a search for three fragments of square shape of the image of the marker strip is carried out: a main one, and ones with indentations upwards and to the right in relation to the main fragment. According to the $x_\varphi$, $y_\varphi$ coordinates of the three fragments on the flat marking strip, three coordinates of the optical centre of the camera $x_3$, $y_3$, $z_3$ and the orientation angles of the optical axis of the camera $\alpha_3$, $\beta_3$, $\gamma_3$ are calculated. The last six parameters allow clearly and with great accuracy to determine the position of the ends of the probes in space and to add points received for this frame to a common cloud of points corresponding to the shape of the inner surface of the object to be measured (FIG. 3).

The technical result of using the device for measuring the shape, dimensions and elastic properties of the inner surface of hollow objects, as well as for building a three-dimensional model of the inner surface of hollow objects is the improvement of accuracy, the reduction of labour intensity and measurement time.

The technical result is achieved by using a device consisting of a body, a camera installed therein, two or more probes with indicators, as well as a flat marking strip.

Figure 4:
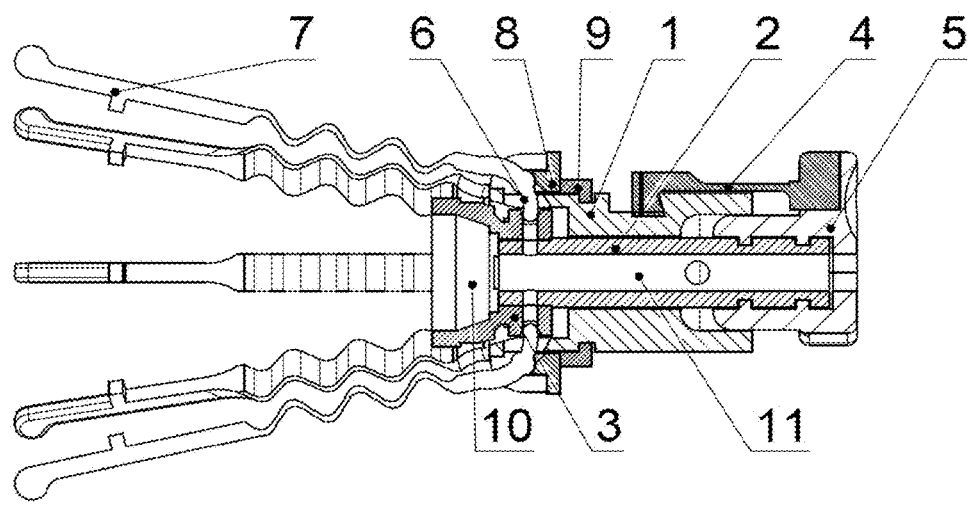
FIG. 4 shows the elements of the proposed device.

FIG. 4 shows the body 1, the axis 2, the lens unit 3, the key 4, the handle 5, the probe 6 with the indicator 7, the locking 8 and fixing 9 half rings, the lens 10, the camera 11 connected to a computer. In the device there is a mechanism allowing to fix the opening angle of the elastic probes in order to restore the shape of the elastic surfaces to be measured.

Figure 5:
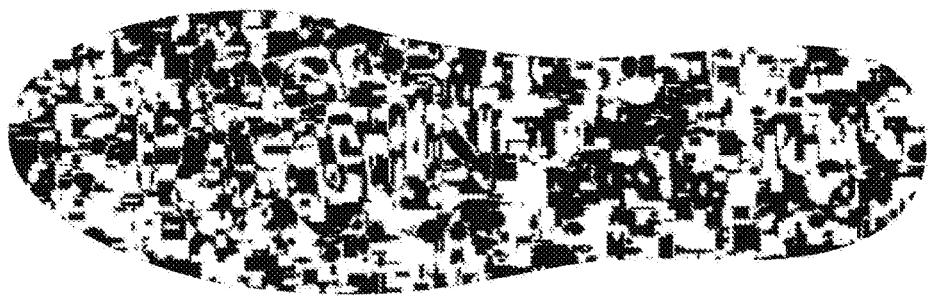
FIG. 5 shows the flat marking strip.

A flat marking strip in the form of an insole for measuring a shoe, which strip is intended for the positioning of the image received from the camera, is shown in space in FIG. 5.

Figure 6:
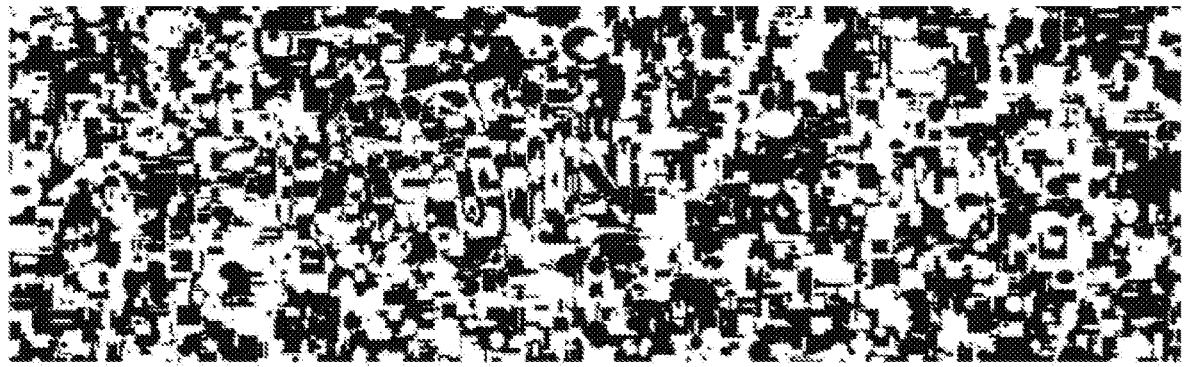
FIG. 6 shows an image of the flat marking strip.

An image for the flat marking strip, said image being generated as a random combination of black and white rectangles and ellipses of different dimensions, is shown in FIG. 6.

Figure 7:
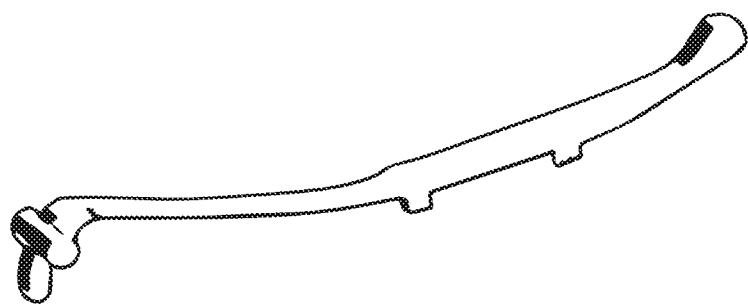
FIG. 7 shows the probe.

The probe shown in FIG. 7 has a complex shape that includes a shank to which the movement of the handle is transmitted, axes located in the beds of the body relative to which it rotates, a convex-shaped shaft sideways to the axis, the beginning of which is flexible in order to create a compression force when extending the probes, and at the end there is a rounding for preventing scratching of the material and for better contact, on the solid part of the shaft there are disposed one or more protrusions for the indicators, the position of which in the three-dimensional space is monitored by a camera built into the mechanism.

The software allows to convert the cloud of captured points into a three-dimensional model of the measured inner surface.

The device works as follows. By moving the handle 5 in the direction opposite to the lens 10, the shanks of the probes 6 moving in the slots of the lens unit 3 reduce the opening angle of the probes until they touch each other. At the same time, the key 4, due to the elastic properties, is in a state of stress on the surface of the body 1. In the retracted position of the probes 6, the device is placed inside the object to be measured. By moving the handle 5 in the direction of the lens 10, the probes 6 are opening up to the required force, determined by a slot in the body 1 into which the key 4 snaps into place, preventing the bending of the probes when removing the force from the handle. The camera 11 is switched on for recording and transmits the position of the indicators 7 relative to the marker strip to a computer. By the handle 5, the device is removed from the object to be measured, wherein the probes 6, due to the stress applied to them, will tightly adjoin to the surface to be measured. After taking images of the measurements the camera turns off. The computer converts the information received into a 3D model of the measured inner surface.

Figure 8:
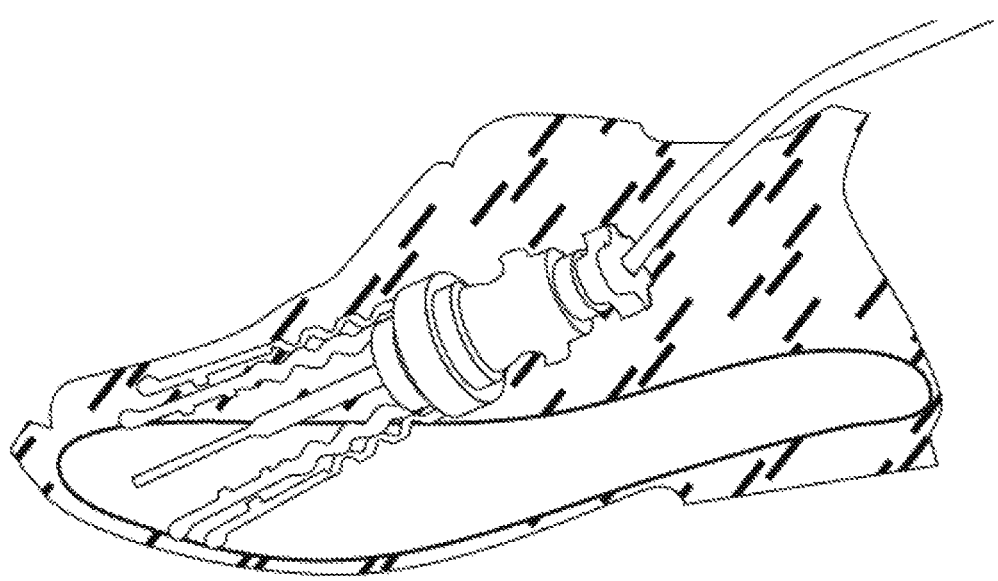
FIG. 8 shows the measurement by the device of the toe cap of a shoe.
Figure 9:
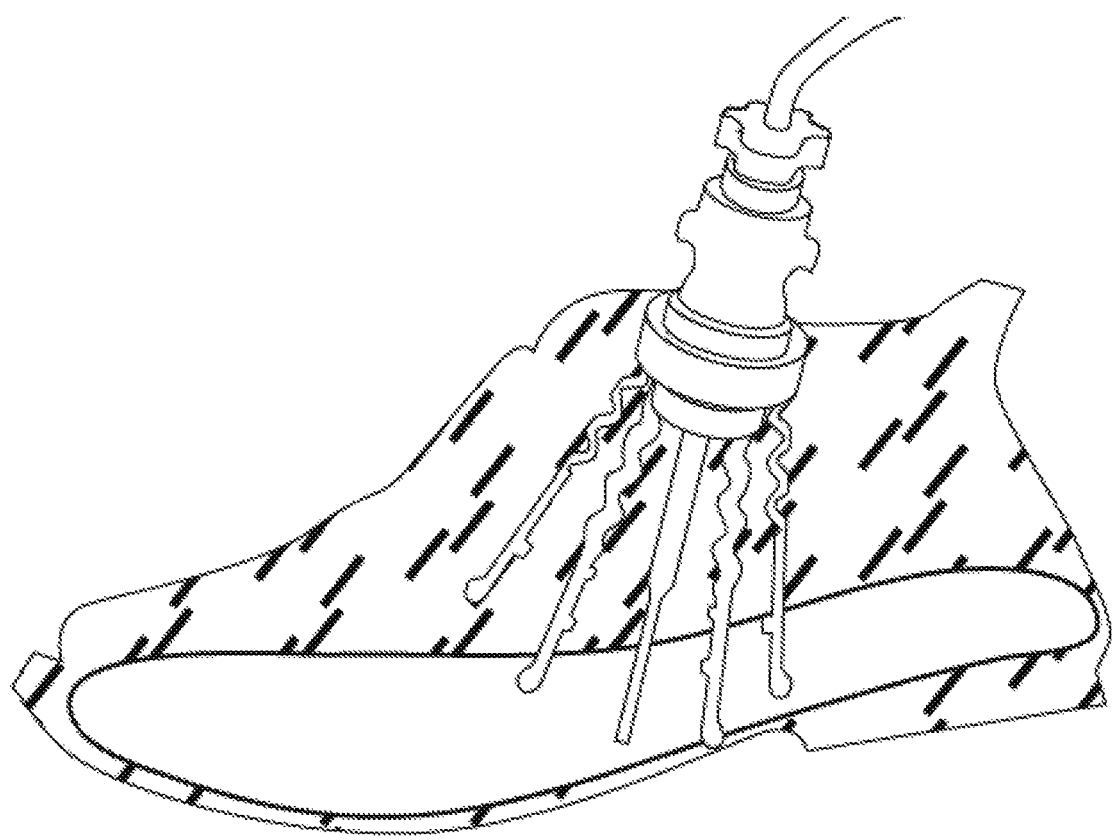
FIG. 9 shows the measurement by the device of the back part of a shoe.
Figure 10:
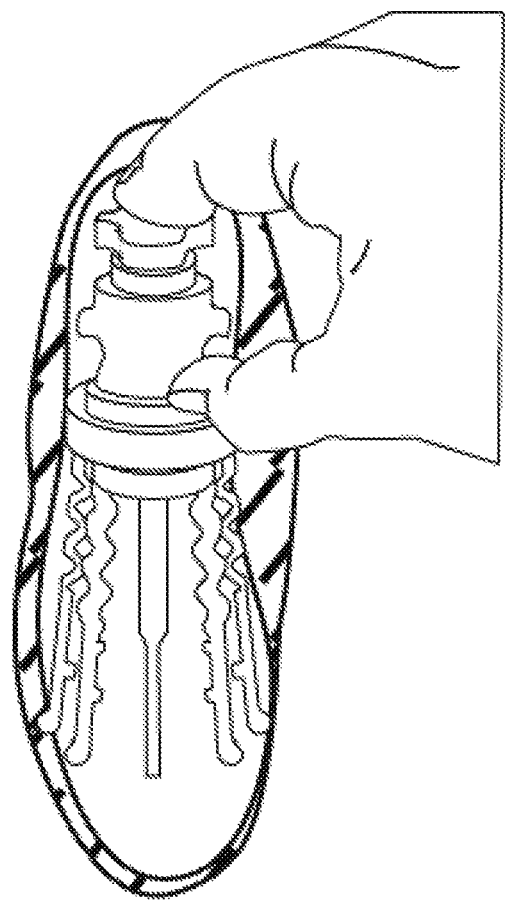
FIG. 10 shows, in cross section of a shoe, the measurement by the device of the middle part of a shoe.
Figure 11:
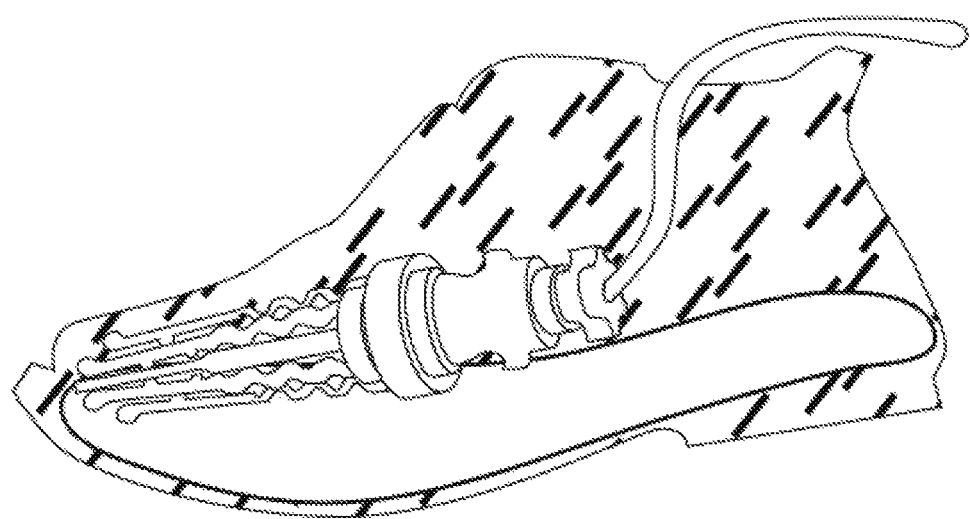
FIG. 11 shows, in a shoe with a transparent upper part, the position of the probes of the device when measuring the toe part.

FIGS. 8, 9, 10 show the position of the device when moving along the inner surface of the object to be measured (a shoe). FIG. 8 shows the measurement by the device of the toe cap of a shoe. FIG. 9 shows the measurement by the device of the back part of a shoe. In order to show the position of the device inside the shoe, a longitudinal cut of the shoe has been made. FIG. 10 shows, in cross section of a shoe, the measurement by the device of the middle part of a shoe. FIG. 11 shows, in a shoe with a transparent upper part, the position of the probes of the device when measuring the toe part. In the figure it can be seen that in all positions the probes with the indicators tightly adjoin to the inner surface of the shoe.

Figure 12:
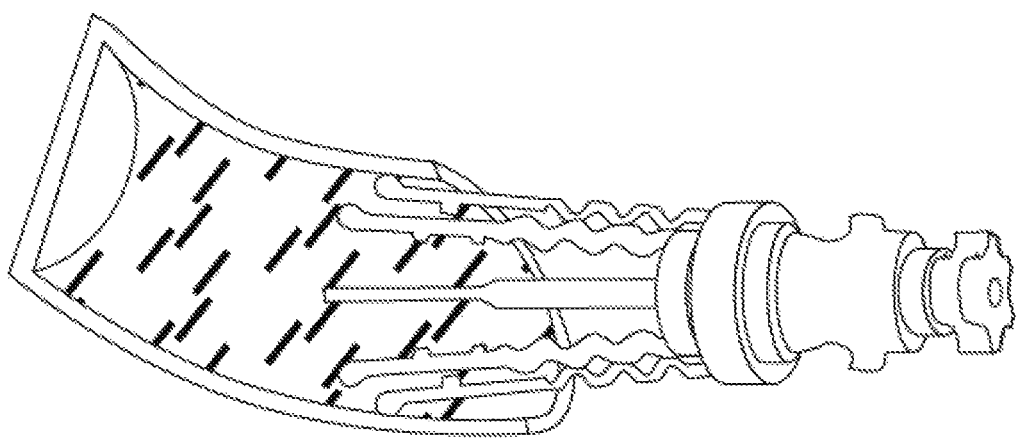
FIGS. 12 and 13 show that the field of application is not limited to shoes, and that the device can measure the inner surfaces of clothing (sleeves) as well as of technical objects—pipes.
Figure 13:
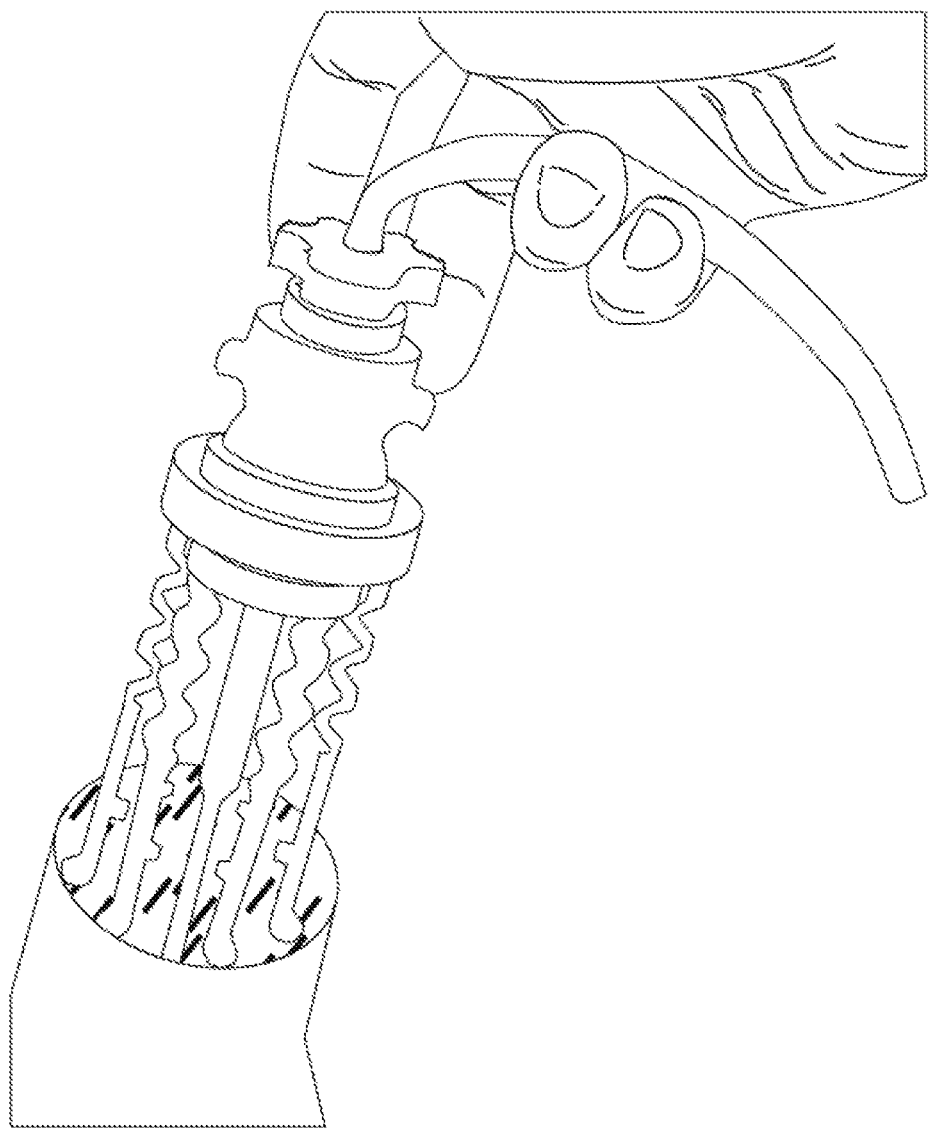

FIGS. 12 and 13 show that the field of application is not limited to shoes, and that the device can measure the inner surfaces of clothing (sleeves) as well as of technical objects—pipes.

Figure 14:
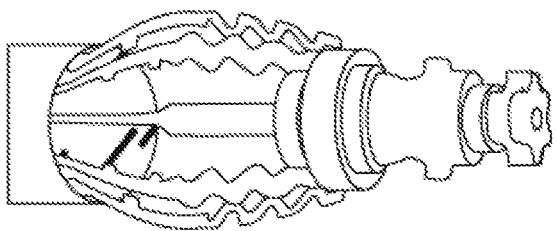
FIG. 14 shows the measurement of the elasticity of a sleeve cuff with high stress.
Figure 15:
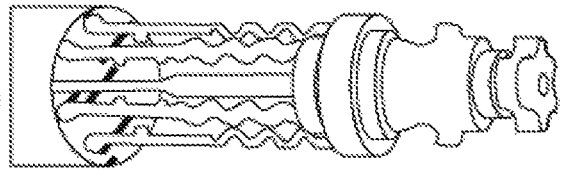
FIG. 15 shows the measurement of the elasticity of a sleeve cuff with low stress.
Figure 16:
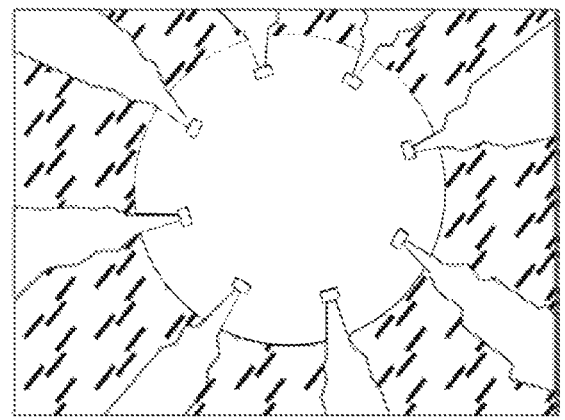
FIGS. 16 and 17 show a camera image when measuring the elasticity of a sleeve cuff.
Figure 17:
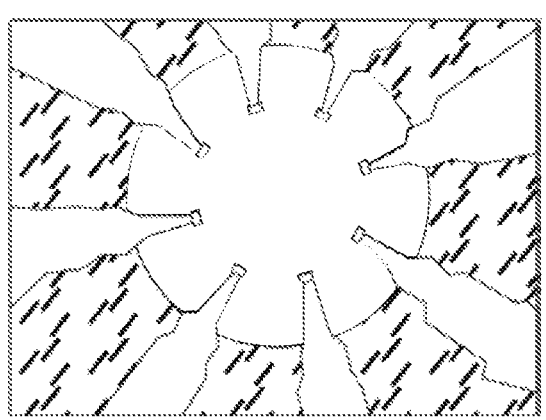

The device is able to fix the probes in several positions, at least in three: the arms closed, half opened, fully opened (angle of 100°). This allows to open the probes with the required force. If the same object of an elastic material is measured with different force, its elastic properties can easily be determined, in particular the magnitude of the absolute deformation equal to the difference modulus between the final and initial dimension of the deformed body. Thus, by means of the device, it becomes possible to measure the elastic tensile properties of different types of leather, fabric and other materials. FIGS. 14 and 15 show the measurement of the elasticity of a sleeve cuff. In FIG. 14, with high stress, in FIG. 15, with low stress. FIGS. 16 and 17 show a camera image when measuring the elasticity of a sleeve cuff. In FIGS. 16 and 17, it can be seen that the section made up of points of the indicators is larger in FIG. 16 than in FIG. 17.

Figure 18:
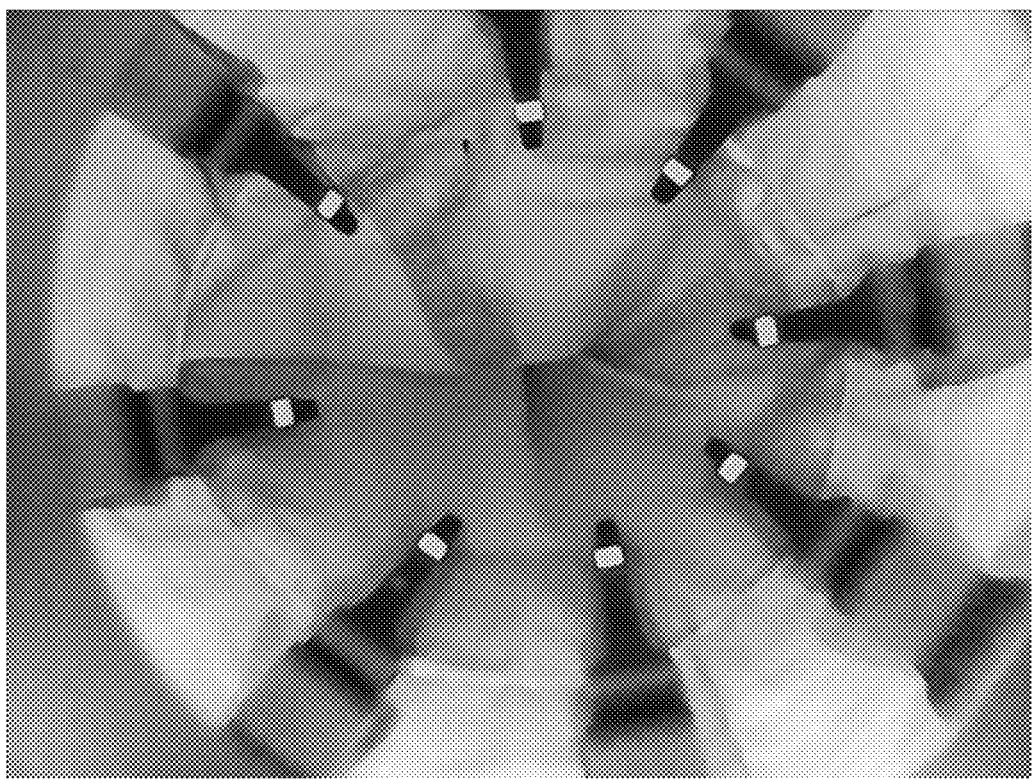
FIG. 18 shows a camera image, on which the seam of a shirt can be seen.

The device also allows to control the quality of a surface and to detect defects that are only visible when stretching an elastic material. FIG. 18 shows a camera image, on which the seam of a shirt can be seen. When inserting the device in the sleeve, the fabric is stretched, and the seam is stretched, wherein all defects can be controlled through the camera.

What is claimed is:

1. A method of measuring a shape, dimensions, and elastic properties of an inner surface of a hollow object, comprising:
    inserting a device into the hollow object, said device comprising a camera and two or more probes with indicators,
    creating a uniform state of stress on the inner surface of the hollow object, via said two or more probes with indicators,
    receiving spatial data in relation to a flat marking strip via said camera,
    forming a three-dimensional model of the inner surface of the hollow object based on said spatial data received by said camera, and
    determining elastic properties of the hollow object by applying a force to the hollow object and measuring a difference modulus between forced dimensions and original dimensions of the hollow object.

2. The method of claim 1, further comprising:
    detecting a position of indicators of probes on video image frames,
    calculating a position of points and of a total of contact points of the probes with the surface through a mathematical algorithm,
    obtaining a set of current sections of the inner surface in a form of a set of points,
    detecting on the video image frames elements of a flat marking strip,
    determining current coordinates and an angular orientation of a device relative to the flat marking strip,
    linking the current section of the surface to a common system of coordinates, combining the sections obtained for a series of frames, and receiving a three-dimensional model of the inner surface in the form of a cloud of points.

* * * * *